United States Patent Office 3,550,032
Patented Dec. 22, 1970

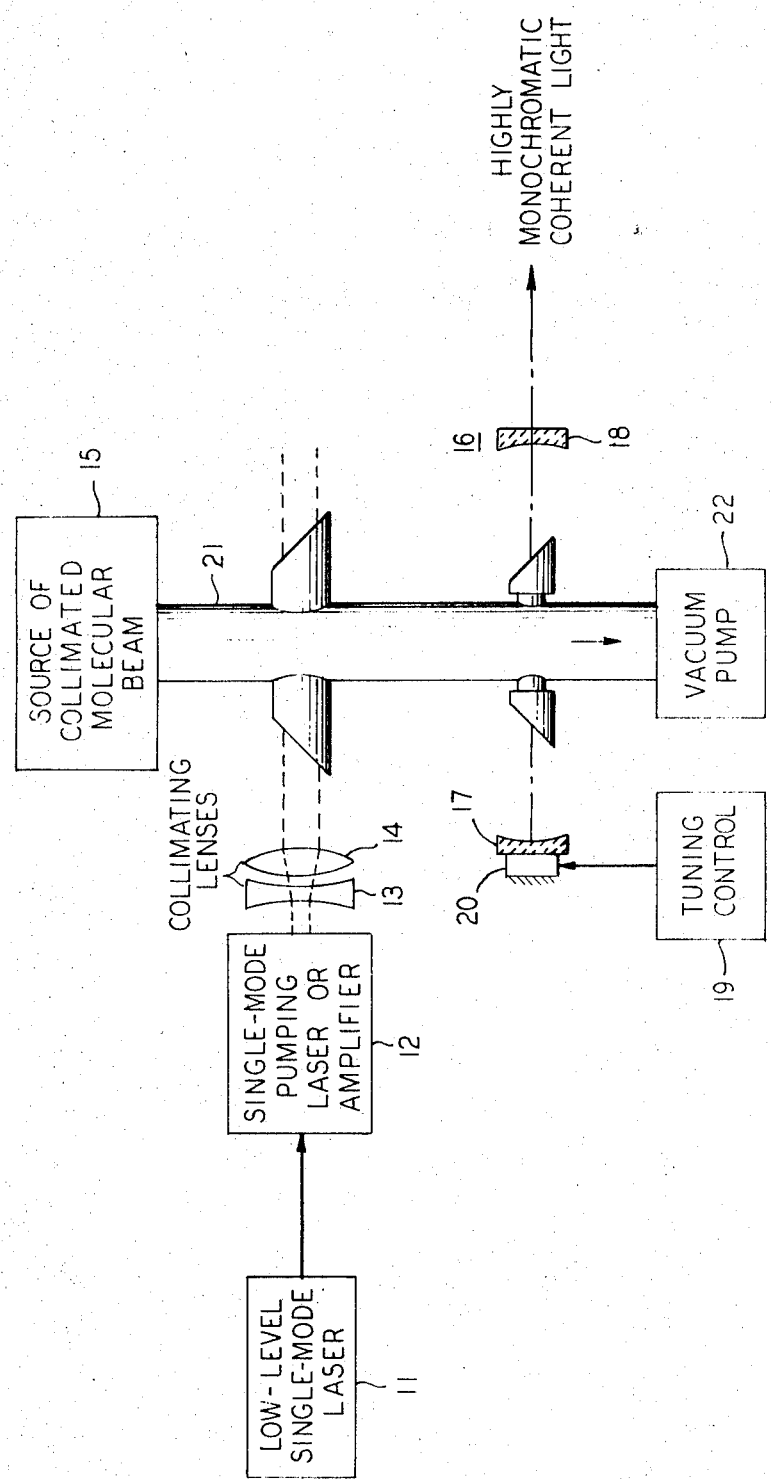

1

3,550,032
LASER FOR USE AS A FREQUENCY STANDARD
Chandra K. N. Patel, Chatham, N.J., assignor to Bell
Telephone Laboratories, Incorporated, Murray Hill,
N.J., a corporation of New York
Filed Mar. 27, 1968, Ser. No. 716,503
Int. Cl. H01s *3/09*
U.S. Cl. 331—94.5                             8 Claims

ABSTRACT OF THE DISCLOSURE

In the laser disclosed, a narrow linewidth and high frequency stability are obtained by collimating a molecular beam of $SF_6$ and by pumping the molecular beam transversely with single-mode coherent radiation of wavelength (e.g., 10.6 microns) closely matching the wavelength of its intended transition. The excited molecular beam is then passed through a resonator oriented transverse to its direction of longitudinal flow and tuned to the center of the intended transition. The resulting linewidth is about $1 \times 10^{-4}$ times that of the pumping radiation; and, therefore, the output is usable as an infrared frequency standard.

BACKGROUND OF THE INVENTION

Optical wavelength standards employing lasers, typically gas lasers, suffer from the disadvantage that the absolute frequency of operation is dependent upon the resonator mirror spacing because of the large linewidth of the lasing transition. The linewidth arises from various broadening processes, typically inhomogeneous broadening, such as so-called Doppler broadening.

Inhomogeneous broadening is broadening which permits the available gain to be depleted at one frequency or a set of frequencies within the linewidth but not depleted at other frequencies within the linewidth. Oscillation can occur at these other frequencies if the resonator tuning is changed. Doppler broadening is the inhomogeneous broadening which occurs because of the relative velocities of the gas molecules.

The realization of an absolute frequency standard employing a gas laser therefore depends upon discovery of techniques for reducing the transition linewidth, particularly the Doppler-broadened linewidth. To be significantly useful, the reduction should be more than one order of magnitude.

SUMMARY OF THE INVENTION

According to my invention, a significant reduction in linewidth of a gas laser is obtained by forming a collimated molecular beam of the active medium, pumping it with single-mode coherent radiation of wavelength closely matching the wavelength of the intended transition and of a strength and duration adapted to provide coherent excitation of the particles and to establish a population inversion, and resonating the stimulated radiation derived from the population inversion in a direction transverse to the molecular beam.

Coherent excitation time, $\tau$, is approximately $h/4P \cdot E$, where $h$ is Planck's constant, $P$ is the electric dipole moment and $E$ is the average pumping electric field acting for the time $\tau$.

It is one advantage of my invention that the resulting linewidth is typically only about $1 \times 10^{-4}$ times as wide as the linewidth of the medium from which the pumping radiation was derived. The high monochromaticity and frequency stability desired in a frequency standard are then obtained by tuning the resonator to the center of the narrowed line.

In a specific embodiment of my invention, I employ a transition of the sulfur hexafluoride ($SF_6$) vibrational-rotational band which is in very near coincidence with the 10.5915 micron vibrational-rotational transition of a carbon dioxide laser which is employed to provide the pumping radiation. (One micron equals $1 \times 10^{-4}$ centimeters.)

It is a characteristic of my invention that, because of collimation of the molecular beam, its molecules possess very small velocities in directions transverse to the flow of the beam. The small transverse velocities, together with resonating the radiation transverse to the flow, account for the great reduction in Dopple-broadened linewidth.

It is also a characteristic of the specific embodiment of my invention that the large oscillator strength of the $SF_6$ transition permits its operation at pressures as low as 0.001 torr (millimeter of mercury), so that pressure-induced shift and pressure-induced broadening of the transition are almost absent. This property further reduces linewidth and improves stability.

As a consequence of all the above-described characteristics, the specifically disclosed embodiment of my invention is readily capable of an absolute frequency stability, as well as relative frequency stability, of 100 cycles per second, or one part in $3 \times 10^{11}$. Absolute frequency stability refers to the deviations obtained in making and operating different fabrications of the oscillator in different places and times; and relative frequency stability refers to the deviations obtained from one given fabrication of the oscillator at different places and times.

BRIEF DESCRIPTION OF THE DRAWING

A more complete understanding of my invention may be obtained from the following detailed description, taken together with the drawing, in which the sole figure is a partially pictorial and partially block diagrammatic illustration of a preferred embodiment of my invention.

DESCRIPTION OF ILLUSTRATIVE EMBODIMENT

In the drawing, the source 15 provides a highly collimated beam of $SF_6$ molecules with a pressure of approximately 0.01 torr. The low-level single-mode laser 11, preferably a carbon dioxide laser operating at 10.5915 microns, drives the single-mode laser oscillator or amplifier 12 of like wavelength, which in turn pumps the collimated $SF_6$ molecular beam by passing transversely therethrough normal to the longitudinal flow direction. The excited $SF_6$ molecular beam then passes through an optical resonator 16 which is oriented with its resonator axis normal to the longitudinal flow direction. The resonator 16, comprising reflectors 17 and 18 and associated apparatus, is tuned to the 10.59 micron $SF_6$ laser transition by tuning control 19, which drives piezoelectric crystal 20 upon which reflector 17 is mounted.

The power of 10.5915 micron laser radiation from laser 12 and the velocity imparted to the molecular beam by source 15 are mutually adjusted so that, during the passage of the $SF_6$ molecules through the $CO_2$ laser beam, the ground state $SF_6$ molecules are coherently excited to the upper level of the desired transition to establish a population inversion between the levels of the transition. In other words, the transit time of the particles through the pumping beam is adjusted for coherent excitation of the particles. For relatively high molecular beam velocities and substantial continuous-wave pumping powers of the order of several watts, the pumping laser beam may be widened along the direction of travel of the molecular beam and collimated by the lenses 13 and 14 to make the transit time of $SF_6$ molecules through the pumping laser beam substantially equal to the time in which substantially all the $SF_6$ molecules can encounter and absorb a 10.5915 micron photon.

The source 15 of the collimated molecular beam may illustratively comprise a tube or duct having an input end connected to a pressurized bottle of $SF_6$ and an output end connected to a small gas jet that directs the gas through two small spaced orifices, so that substantially only molecules having velocities in the desired direction are passed. To maintain the molecular beam beyond the orifices, it is kept in an enclosed structure 21, as shown, in which a near-vacuum is maintained by vacuum pump 22. Such an arrangement can readily provide gas pressures less than 0.1 torr, preferably about 0.01 torr, at velocities of $10^3$ meters per second or more. Nevertheless, it should be understood that any of the other sources of collimated molecular beams, such as employed in the microwave maser art, could be used for source 15. Most of these are based upon the principle of employing a long duct of some type that provides a collimated low-pressure flow at the output.

The lasers 11 and 12 are illustratively of the type disclosed in my copending patent application Ser. No. 495,844, filed Oct. 14, 1965, and assigned to the assignee hereof, with the exception that laser 11 is operated very near the threshold of oscillation in order to obtain a single longitudinal and transverse mode of oscillation at 10.5915 microns. The output of laser 11 is in the nature of a "seeding beam" for oscillator 12, which has a partially transparent left-hand reflector that serves as its input aperture. The seeding beam controls the oscillation wavelength and mode structure of the higher-power laser 12.

Reflector 17 is coated with vacuum-deposited gold to be opaque; and reflector 18 is coated with vacuum-deposited gold or is dielectric coated to be partially transparent. The output radiation transmitted through reflector 18 may be received in a suitable utilization apparatus, for example, a frequency comparator, inasmuch as its stability and high monochromaticity makes it useful as a frequency standard.

Tuning control 19 may be a circuit adapted to generate a manually adjustable direct-current voltage; or it may include a feedback loop (not shown) from a detector disposed to intercept a portion of the output beam. The resonator 16 then can be tuned to the center of the narrowed $SF_6$ line by driving the voltage of control 19 in a direction to maximize the detected power output. Such a servo loop does not need to be complicated inasmuch as the $SF_6$ laser linewidth is so exceedingly narrow.

In operation, the Doppler width of the absorbing transition as presented to the pumping beam passing normal to the $SF_6$ flow is considerably less than 30 megacycles per second, which is the absorption linewidth, $\Delta\nu_D$, at room temperature for randomly moving $SF_6$ molecules. In fact, the absorbing linewidth is more than two orders of magnitude less than $\Delta\nu_D$, or less than 300 kilocycles per second.

As the $SF_6$ molecules pass through the $CO_2$ laser beam, the ground state $SF_6$ molecules are coherently excited to the upper level. A population inversion results.

Upon entering resonator 16, the excited $SF_6$ molecules undergo laser action, as a random emission at the resonant frequency of the resonator starts a stimulated emission of coherent radiation. Note that this laser oscillation and wave propagation is in a direction normal to the direction of $SF_6$ beam motion. Thus, the laser action sees a greatly reduced Doppler width for the transition. The actual lasing action is restricted to the center portion of the narrowed Doppler-broadened line by the tuned resonator 16.

Calculations show that, at the indicated pressure of the $SF_6$ beam, an absolute frequency as well as relative frequency stability of about 100 c.p.s., or one part in $3 \times 10^{11}$, is obtainable ideally.

Modifications of my invention could involve substitution of other suitable matched pairs of gases for generation of other frequencies. Harmonic generation and subharmonic generation are alternative techniques for deriving other frequencies.

Also, additional stages for amplifying the stable oscillator power output can be $CO_2$ laser amplifiers.

It is to be expected that efforts to isolate resonator 16 form disturbances would be beneficial, although not required.

I claim:
1. A laser comprising an active gaseous medium having a pair of energy levels between which a population inversion can be established, means for establishing a flow of said medium in which transverse velocities of component particles are negligible compared to the longitudinal flow velocity, means for pumping said medium to establish said population inversion, said pumping means including a source of a beam of essentially monochromatic coherent radiation in a single longitudinal and transverse mode directed through said flow, and means for resonating coherent radiation from said pumped medium in a direction transverse to said flow.

2. A laser according to claim 1 in which the pumping means and the flow establishing means are mutually adjusted to provide a selected interaction time of the component particles of the active medium with the pumping beam of coherent radiation, said selected interaction time being directly related to the coherent excitation time for said particles.

3. A laser according to claim 1 in which the resonating means is oriented to resonate the coherent radiation orthogonal to the flow of the active medium and in which the pumping means is oriented to direct the pumping beam orthogonal to said flow, the transit time of the active medium particles through said pumping beam being substantially equal to the coherent excitation time of said particles.

4. A laser according to claim 1 in which the resonating means is tunable, the laser including means for tuning said resonating means.

5. A laser according to claim 1 in which the active gaseous medium is $SF_6$, the pumping means includes a carbon dioxide laser source providing a beam of coherent radiation at about 10.6 microns, said beam being directed orthogonal to the flow of the active medium, and the resonating means is an optical resonator having a principal axis orthogonal to the flow of $SF_6$ particles which have the population inversion.

6. A laser according to claim 5 in which the flow establishing means establishes a pressure of the flowing $SF_6$ molecules which is less than 0.1 torr.

7. A laser according to claim 1 in which the means for resonating coherent radiation is free of radiation of the desired frequency from external sources.

8. A laser according to claim 5 in which the means for resonating coherent radiation is free of radiation of the desired frequency from external sources.

References Cited
UNITED STATES PATENTS

| | | | |
|---|---|---|---|
| 2,851,652 | 9/1958 | Dicke | 330—4 |
| 3,434,072 | 3/1969 | Birnbaum | 331—94.5 |
| 3,464,023 | 8/1969 | Birnbaum | 331—94.5 |

RONALD L. WIBERT, Primary Examiner

T. MAJOR, Assistant Examiner